United States Patent
Mukai et al.

(10) Patent No.: US 8,651,356 B2
(45) Date of Patent: Feb. 18, 2014

(54) SOLDER BUMP FORMING APPARATUS AND SOLDERING FACILITY INCLUDING THE SAME

(71) Applicant: Samsung Electro-Mechanics Co., Ltd., Suwon (KR)

(72) Inventors: Noriaki Mukai, Suwon (KR); Hueng Jae Oh, Suwon (KR); Dae Young Lee, Ansan (KR); Jin Won Choi, Yongin (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/675,235

(22) Filed: Nov. 13, 2012

(65) Prior Publication Data

US 2013/0134208 A1 May 30, 2013

(30) Foreign Application Priority Data

Nov. 29, 2011 (KR) ........................ 10-2011-0125896

(51) Int. Cl.
*B23K 1/00* (2006.01)
*B23K 1/08* (2006.01)

(52) U.S. Cl.
USPC ................... 228/8; 228/33; 228/37; 228/45

(58) Field of Classification Search
None
See application file for complete search history.

(56) References Cited

U.S. PATENT DOCUMENTS

| | | | |
|---|---|---|---|
| 3,508,522 A * | 4/1970 | St Onge et al. .................. 118/50 |
| 3,941,088 A * | 3/1976 | Ronafoldi et al. ............ 118/620 |
| 3,948,212 A * | 4/1976 | Mayer ............................... 118/50 |
| 3,958,740 A * | 5/1976 | Dixon ............................ 228/102 |
| 4,451,000 A * | 5/1984 | Stephens ....................... 228/20.1 |
| 4,573,430 A * | 3/1986 | Benson et al. ................. 118/411 |
| 4,799,450 A * | 1/1989 | Cornellier ........................ 118/63 |
| 4,898,117 A * | 2/1990 | Ledermann et al. ........... 118/665 |
| 5,238,175 A * | 8/1993 | Hughey et al. ............. 228/180.1 |
| 5,238,176 A * | 8/1993 | Nishimura ..................... 228/256 |
| 5,240,018 A * | 8/1993 | Clark et al. ................. 134/64 R |
| 5,240,738 A * | 8/1993 | Quirk ............................ 427/99.3 |
| 5,411,197 A * | 5/1995 | Nakamura et al. .............. 228/34 |
| 5,617,990 A * | 4/1997 | Thompson, Sr. ........... 228/180.1 |
| 5,820,013 A * | 10/1998 | Ortiz ................................ 228/43 |
| 6,364,195 B1 * | 4/2002 | Masuda et al. ................... 228/37 |
| 6,372,624 B1 | 4/2002 | Farnworth et al. |
| 6,527,158 B1 * | 3/2003 | Brouillette et al. ............. 228/33 |
| 6,786,385 B1 * | 9/2004 | Kitajima et al. ................... 228/8 |
| 7,931,187 B2 | 4/2011 | Gruber et al. |
| 2002/0047039 A1 * | 4/2002 | Mawatari ....................... 228/260 |
| 2002/0179693 A1 * | 12/2002 | Kawashima et al. ......... 228/232 |
| 2003/0116352 A1 * | 6/2003 | Nakatsuka et al. ........... 174/263 |
| 2003/0136816 A1 * | 7/2003 | McDonald .................... 228/203 |
| 2005/0023681 A1 * | 2/2005 | Uchida et al. ................. 257/737 |
| 2010/0163599 A1 * | 7/2010 | Zen et al. ......................... 228/37 |
| 2012/0325899 A1 * | 12/2012 | Willemen ..................... 228/203 |

FOREIGN PATENT DOCUMENTS

| | | | | |
|---|---|---|---|---|
| JP | 58-074274 A | * | 5/1983 |
| JP | 11-135931 A | * | 5/1999 |
| JP | 2000-323825 A | * | 11/2000 |

(Continued)

*Primary Examiner* — Kiley Stoner

(57) ABSTRACT

Disclosed herein is a solder bump forming apparatus performing a soldering process on a substrate, the solder bump forming apparatus including: a solder bath receiving a solder therein; an agitator agitating the solder in the solder bath; a driver driving the agitator; and a suction pressure provider providing suction pressure to the substrate.

15 Claims, 5 Drawing Sheets

(56) References Cited

FOREIGN PATENT DOCUMENTS

| | | | | |
|---|---|---|---|---|
| JP | 2002-084062 A | * | 3/2002 | |
| JP | 2002-374063 A | * | 12/2002 | |
| JP | 2008-41854 | | 2/2008 | |
| SU | 577706 | * | 11/1977 | |

* cited by examiner

SOLDER BUMP FORMING APPARATUS AND SOLDERING FACILITY INCLUDING THE SAME

CROSS REFERENCE(S) TO RELATED APPLICATIONS

This application claims the foreign priority benefit under 35 U.S.C. Section 119 of Korean Patent Application Serial No. 10-2011-0125896, entitled "Solder Bump Forming Apparatus and Soldering Facility Including the Same" filed on Nov. 29, 2011, which is hereby incorporated by reference in its entirety into this application.

BACKGROUND OF THE INVENTION

1. Technical Field

The present invention relates to a solder bump forming apparatus and a soldering facility including the same, and more particularly, to a solder bump forming apparatus capable of effectively forming a solder bump with respect to a fine-pitched circuit board, and a soldering facility including the same.

2. Description of the Related Art

A process of manufacturing a printed circuit board (PCB) generally includes a process of forming a solder bump on an electrode pad formed on a substrate. The process of forming a solder bump as described above is typically performed using a squeeze soldering method, a wave soldering method, and the like.

In the squeeze soldering method, a solder bump is formed by closely adhering a screen mask to a substrate so that an electrode pad formed on the substrate is selectively exposed, applying a predetermined amount of solder onto the screen mask, and then allowing the solder to selectively contact the electrode pad through the screen mask while squeezing the screen mask using a plate called a squeeze. In the wave soldering method, a solder bump is formed by preparing a solder bath filled with a solder and then allowing the solder in the solder bath to contact an electrode pad of a substrate having a protection pattern formed thereon so that the electrode pad is selectively exposed on the solder bath while transferring the substrate.

However, in the case of the soldering methods as described above, it is difficult to form effectively form a solder bump with respect to a significantly fine-pitched circuit board.

RELATED ART DOCUMENT

Patent Document (Patent Document 1) Japanese Patent Laid-Open Publication No. 2008-41854
(Patent Document 2) U.S. Pat. No. 6,372,624
(Patent Document 3) U.S. Pat. No. 7,931,187

SUMMARY OF THE INVENTION

An object of the present invention is to provide a solder bump forming apparatus capable of effectively forming a solder bump, and a soldering facility including the same.

An object of the present invention is to provide a solder bump forming apparatus capable of effectively forming a solder bump with respect to a fine-pitched circuit board, and a soldering facility including the same.

According to an exemplary embodiment of the present invention, there is provided a solder bump forming apparatus performing a soldering process on a substrate, the solder bump forming apparatus including: a solder bath receiving a solder therein; an agitator agitating the solder in the solder bath; a driver driving the agitator; and a suction pressure provider providing suction pressure to the substrate.

The suction pressure provider may include: a suction chamber provided to enclose the solder bath to thereby provide, together with the solder bath, a space in which the suction pressure is applied; and a suction line connected to the suction chamber.

The suction pressure may be vacuum pressure, and a vacuum pump may be provided on the suction line.

The solder bath may include a storing container having a structure in which an upper portion thereof is opened, wherein the storing container includes: a lower wall; a lower sidewall vertically extended upwardly from the lower wall; and an upper sidewall extended to be inclined so as to become close to the center of the storing container from an upper end of the lower sidewall toward an upward direction.

The agitator may include at least one agitating roller rotatably installed in the solder bath.

The agitator may include a heating device heating the solder in the solder bath.

The agitator may include: an agitating roller rotatably installed in the solder bath; a heater fixedly installed in the agitating roller to thereby heat the solder; and a temperature controller controlling a heating temperature of the heater.

The driver may include: a double gear coupled to the agitator, the double gear including a fixed gear and a rotating gear coupled to the agitator and rotating along the circumference of the fixed gear based on the fixed gear; and a driving motor driving the double gear.

The agitator may include: an agitating roller rotatably provided in the solder bath; a heater provided in the agitating roller; and a temperature controller having an electrical line connected to the heater so as to control a heating temperature of the heater, wherein the electrical line is connected to the heater through the fixed gear.

According to another exemplary embodiment of the present invention, there is provided a soldering facility including: a substrate transferring apparatus transferring a processing substrate; and a solder bump forming apparatus performing a soldering process on the processing substrate transferred by the substrate transferring apparatus, wherein the solder bump forming apparatus includes: a solder bath receiving a solder therein; an agitator agitating the solder in the solder bath; a driver driving the agitator; and a suction pressure provider providing suction pressure to the processing substrate transferred on the solder bath by the substrate transferring apparatus.

The substrate transferring apparatus may include: a clamper clamping an edge portion of the processing substrate so that processing surface of the processing substrate is directed downwardly; and a clamper transferring device driving the clamper.

The soldering facility may further include a protection pattern attaching device attaching a protection pattern selectively exposing an electrode pad formed on a circuit board to a processing surface of the circuit board.

The suction pressure provider may include: a suction chamber provided to enclose the solder bath to thereby provide, together with the solder bath, a space in which the suction pressure is applied; and a suction line connected to the suction chamber.

The solder bath may include a storing container having a structure in which an upper portion thereof is opened, wherein the storing container includes: a lower wall; a lower sidewall vertically extended upwardly from the lower wall; and an upper sidewall extended to be inclined so as to become close to the center of the storing container from an upper end of the lower sidewall toward an upward direction.

The agitator may include: an agitating roller rotatably installed in the solder bath; and a heating device provided in the agitating roller to thereby heat the solder.

The driver may include: a double gear coupled to the agitator, the double gear including a fixed gear and a rotating gear coupled to the agitator and rotating along the circumference of the fixed gear based on the fixed gear; and a driving motor driving the double gear.

The agitator may include: an agitating roller rotatably provided in the solder bath; a heater provided in the agitating roller; and a temperature controller having an electrical line connected to the heater so as to control a heating temperature of the heater, wherein the electrical line is connected to the heater through the fixed gear.

DESCRIPTION OF THE PREFERRED EMBODIMENTS

Figure 1:
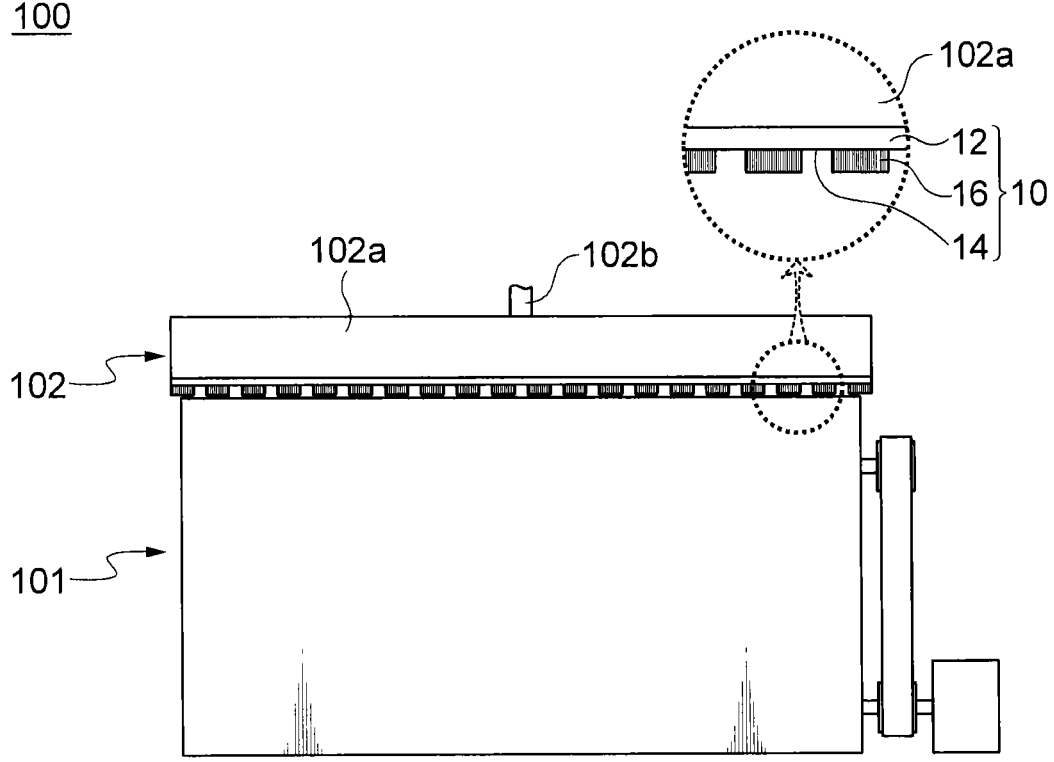
FIG. 1 is a view showing a soldering facility according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. Rather, these embodiments may be provided so that this disclosure will be thorough and complete, and will fully convey the scope of the invention to those skilled in the art. Like reference numerals throughout the description denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, a solder bump forming apparatus and a soldering facility including the same according to an exemplary embodiment of the present invention will be described in detail.

FIG. 1 is a view showing a soldering facility according to an exemplary embodiment of the present invention. Referring to FIG. 1, the soldering facility 100 according to the exemplary embodiment of the present invention may include a solder bump forming apparatus 101 and a substrate transferring apparatus 102.

The solder bump forming apparatus 101 may perform a soldering process on a predetermined processing substrate 10. The soldering process may be a process of forming a solder bump on the processing substrate 10, which is a printed circuit board (PCB).

The substrate transferring apparatus 102 may move the processing substrate 10 horizontally over the solder bump forming apparatus 101 at the time of the soldering process. The substrate transferring apparatus 102 may include a clamper 102a clamping the processing substrate 10 so that a processing surface of the processing substrate 10 is directed downwardly and a clamper transferring device 102b transferring the clamper 102a. The clamper 102a may selectively clamp only a non-processing region of an edge of the processing substrate 10. The clamper transferring device 102b may transfer the clamper 102a so that the processing substrate 10 moves horizontally along an upper portion of the solder bump forming apparatus 101.

Meanwhile, the processing substrate 10 may be a structure in which a protection pattern 16 selectively exposing an electrode pad 14 of a circuit board 12 with respect to the circuit board 12 is formed. To this end, the soldering facility 100 may further include a protection pattern attaching device (not shown) for forming the protection pattern 16 on the circuit substrate 10. The protection pattern attaching device may be a device attaching a dry film on the circuit board 10. Alternatively, the protection pattern attaching device may be a device attaching a polymer mask on the circuit board 10.

The soldering facility 100 having the above-mentioned structure may be a so called wave soldering facility in which the solder bump forming apparatus 101 is disposed at a lower portion and a soldering process is performed on the transferred processing substrate 10 while the substrate transferring apparatus 102 transfers the processing substrate 10 along an upper portion of the solder bump forming apparatus 101.

Next, the solder bump forming apparatus according to the exemplary embodiment of the present invention will be described in detail.

Figure 2:
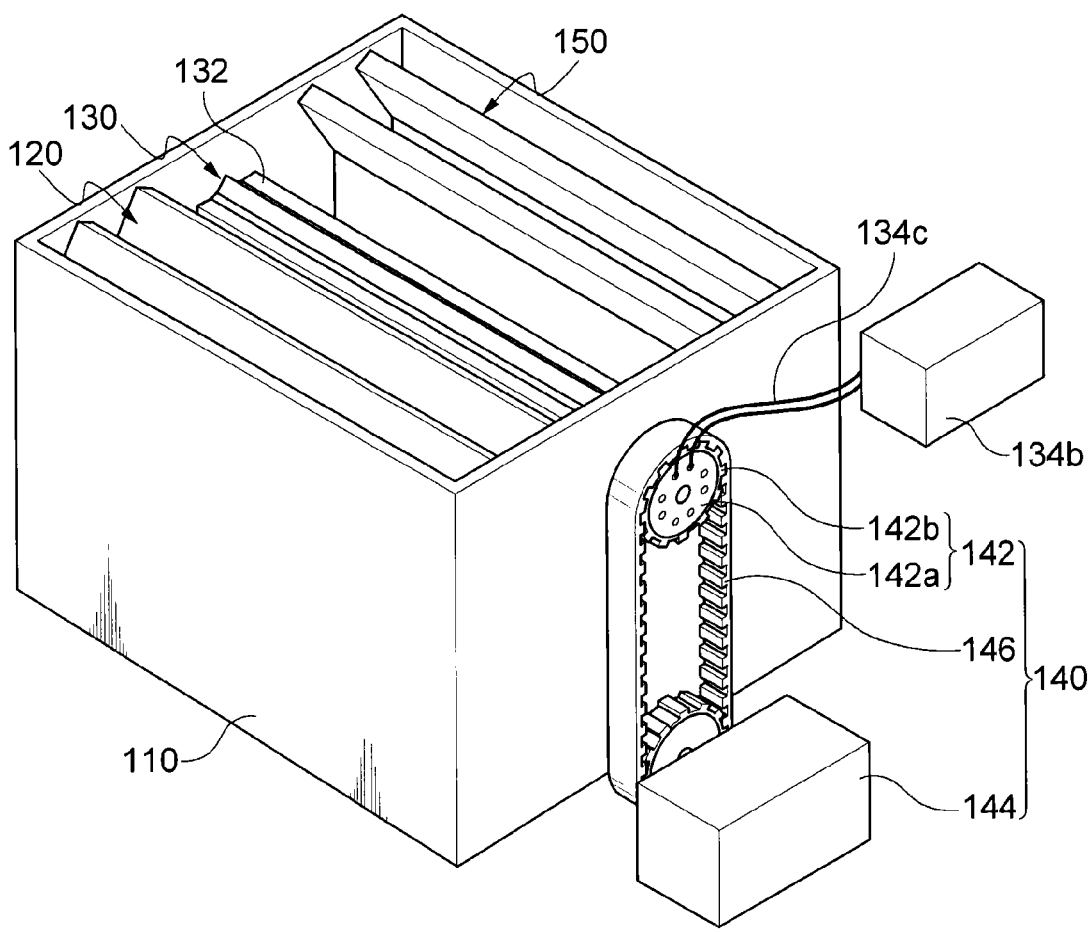
FIG. 2 is a view showing a solder bump forming apparatus according to the exemplary embodiment of the present invention.
Figure 3:
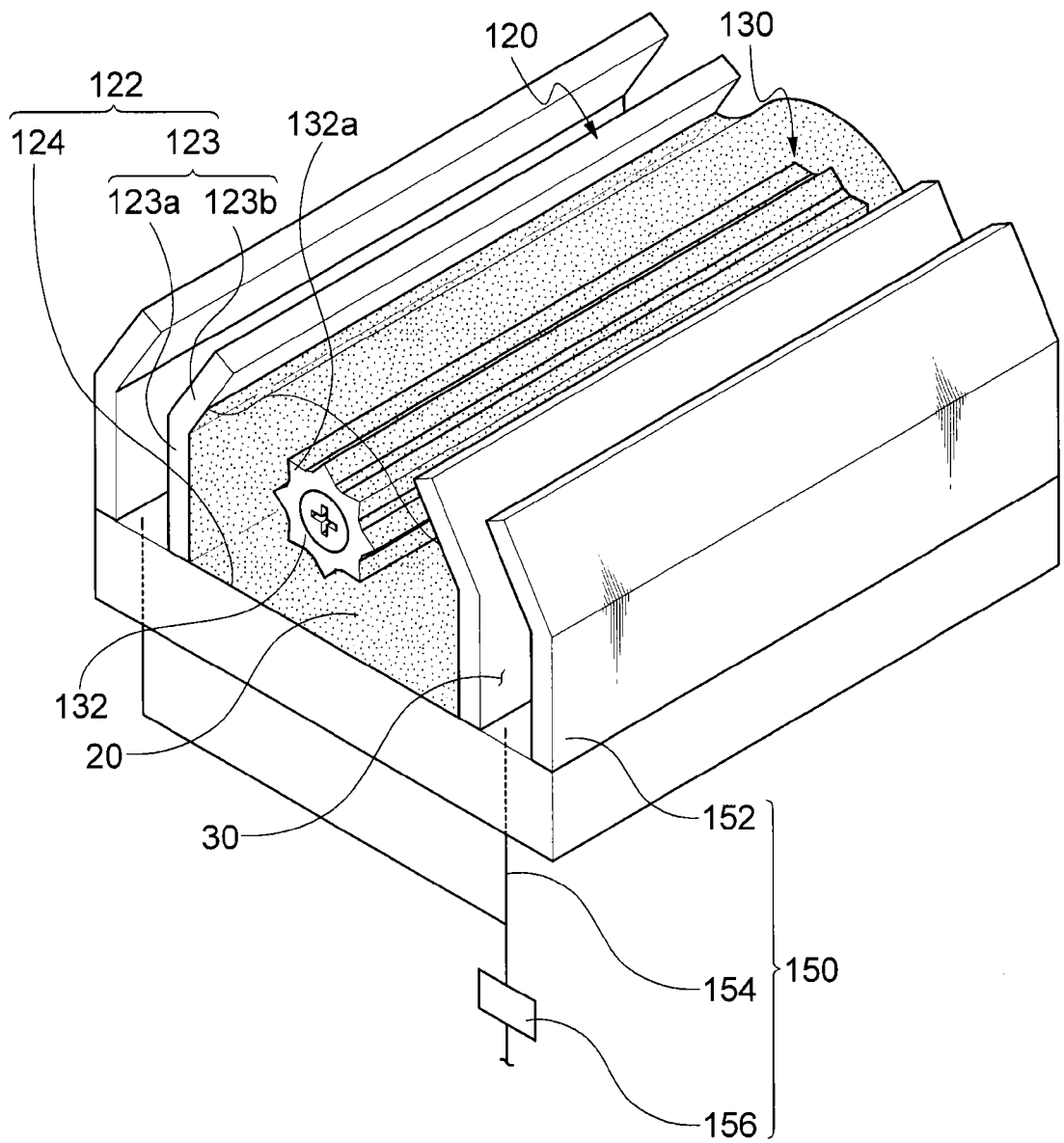
FIG. 3 is a view showing main components of an inner portion of the solder bump forming apparatus shown in FIG. 2.

FIG. 2 is a view showing a solder bump forming apparatus according to the exemplary embodiment of the present invention; and FIG. 3 is a view showing main components of an inner portion of the solder bump forming apparatus shown in FIG. 2. In addition, FIG. 4 is a view showing a driving part of the solder bump forming apparatus shown in FIG. 2.

Figure 4:
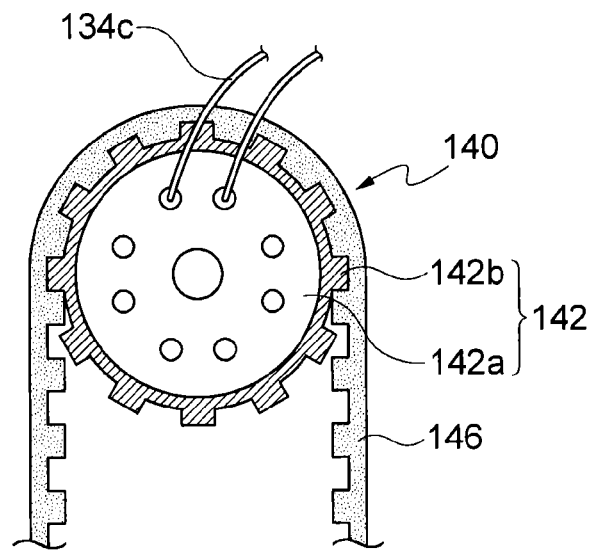
FIG. 4 is a view showing a driving part of the solder bump forming apparatus shown in FIG. 2.

Referring to FIGS. 2 to 4, the solder bump forming apparatus 101 according to the exemplary embodiment of the present invention may include a housing 110, a solder bath 120, an agitator 130, a driver 140, and a suction pressure provider 150.

The housing 110 may be a case for supporting and protecting components of the solder bump forming apparatus 101. To this end, the housing 110 may have sidewalls and a table structure enclosing the solder bath 120, the agitator 130, and the suction pressure provider 150 at an outer portion thereof. In addition, the housing 110 may provide a frame for installing the driver 140.

The solder bath 120 may receive a solder 20 in a molten state therein. As an example, the solder bath 120 may have a storing container 122 storing the solder 20 therein. The storing container 122 may have a shape in which an upper portion thereof is opened, and include sidewalls 123 and a lower wall 124. The sidewall 123 may have a lower sidewall 123a vertically extended upwardly from the lower wall 124 and an upper sidewall 134b extended upwardly from an upper end of the lower sidewall 123a and extended to be inclined so as to become close to the center of the storing container 122 toward an upward direction. Therefore, the storing container 122 may have a lower portion having a hexahedral shape with a constant width and an upper portion having a shape with a width that becomes narrow toward an upward direction.

The agitator 130 may agitate the solder 20 in the solder bath 120. As an example, the agitator 130 may include an agitating roller 132 rotatably installed in the solder bath 120. The agitating roller 132 may provide movement pressure to the solder 10 at the time of the soldering process to move the solder 10 as a predetermined flow. In order to effectively provide the movement pressure to the solder 10, the agitating roller 132 may have a screw thread 132a formed on a surface thereof. A specific shape of the screw thread 132a may be variously changed and varied. For example, a surface structure of the agitating roller 132 may be changed into various shapes of concave-convex structures, embossing structures, screw structures, and the like. The agitator 130 is a component directly contacting the solder 20. Therefore, in order to prevent a damage of the agitator 130 due to the solder 20, the agitator 130 may be made of stainless steel, a ceramic material or the like.

In addition, the agitator 130 may further include a heating device 134 heating the solder 20 to a preset temperature. As an example, the heating device 134 may include a heater 134a provided in the agitating roller 132 and a temperature controller 134b controlling a heating temperature of the heater 134a. The temperature controller 134b may control a temperature of the heater 134a so that the heater 134a maintains a preset heating temperature. The temperature controller 134b may have an electrical line connected to the heater 134a. In this case, the agitator 130 may heat the solder 20 to the preset temperature simultaneously with agitating the solder 20, while rotating in the solder bath 120.

Meanwhile, the heater 134a may have a structure in which it is inserted into the agitating roller 132. For example, the heater 134a may be fixedly installed in the agitating roller 132 so that it does not rotate. To this end, the heater 134a may have generally a bar shape. The agitating roller 132 may have a hollow structure so that an installation space of the heater 134a is provided therein. Therefore, the agitating roller 132 is rotatably installed in a circumference of the heater 134a, such that the heater 134a may be free from rotation movement of the agitating roller 132.

The driver 140 may drive the agitator 130. As an example, the driver 140 may drive the agitator 130 in a chain driving scheme. The driver 140 may include a double gear 142, a driving motor 144, and a chain 146 transporting rotational force of the driving motor 144 to the double gear 142. The double gear 142 may include a fixed gear 142a and a rotating gear 142b enclosing a circumference of the fixed gear 142a. The rotating gear 142b may be configured to rotate along the circumference of the fixed gear 142a based on the fixed gear 142a. The rotating gear 142b may be coupled to the agitating roller 132 to rotate together with the agitating roller 132. The chain 146 may be provided to enclose each of the rotating gear 142b and a gear coupled to the driving motor 144, thereby transporting the rotational force of the driving motor 144 to the rotating gear 142b.

Although a case in which the driver 140 drives the agitator 130 in the chain driving scheme has been described in the exemplary embodiment of the present invention described above by way of example, a scheme of driving the agitator 130 in the driver 140 may be variously changed. For example, the driver 140 may drive the agitator 130 in a belt driving scheme. Alternatively, the driver 140 may drive the agitator 130 in an electromagnetic force driving scheme.

Meanwhile, the electrical line 134c of the temperature controller 134b may be connected to the heater 134a through a hole formed in the fixed gear 142a. Since the heater 134a and the fixed gear 142a are designed so be free from the rotation movement of the agitating roller 132, the electrical line 134a may not be hindered from the rotation of the agitator 130.

The suction pressure provider 150 may provide suction pressure to the processing substrate 10. For example, the suction pressure provider 150 may include a suction chamber 152 provided at both sides of the solder bath 120 and a suction line 154 connected to the suction chambers 152. The suction chamber 152 may define, together with a sidewall of the solder bath 120, a space (hereinafter, referred to a suction pressure providing space 30) in which suction pressure is provided. To this end, the suction chamber 152 may be provided to enclose the sidewall of the solder bath 120 while being spaced apart from the sidewall of the solder bath 120 by a predetermined interval, thereby forming, together with the solder bath 120, the suction pressure providing space 30 closed from an external space. The suction line 154 may be connected to the suction chamber 152 to allow the suction pressure to be applied to the suction pressure providing space 30. To this end, a suction member 156 such as a vacuum pump may be provided on the suction line 154.

Hereinafter, a process of performing a soldering process on the processing substrate 10 using the soldering facility 100 according to the exemplary embodiment of the present invention will be described in detail. Here, a description overlapped with that of the soldering facility 100 described above may be omitted or simplified.

Figure 5:
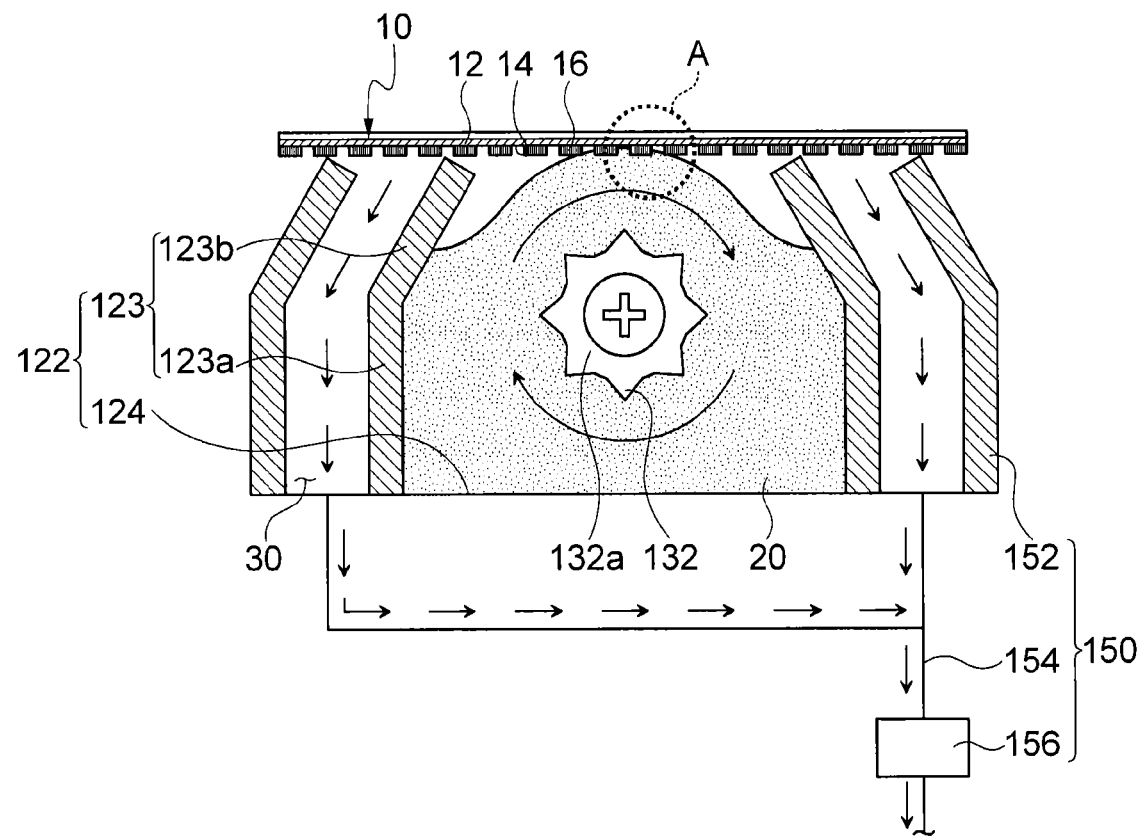
FIG. 5 is a view describing a process of forming a solder bump in the solder bump forming apparatus according to the exemplary embodiment of the present invention.
Figure 6:
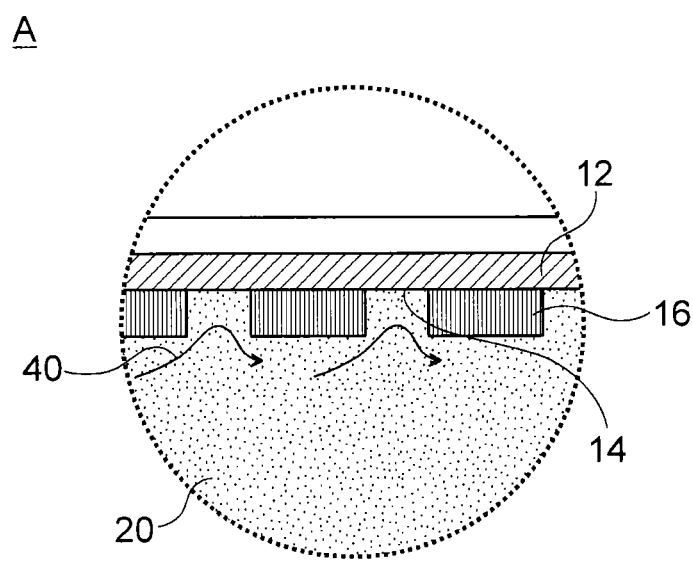
FIG. 6 is an enlarged view showing the region A of FIG. 5.

FIG. 5 is a view describing a process of forming a solder bump in the solder bump forming apparatus according to the exemplary embodiment of the present invention; and FIG. 6 is an enlarged view showing the region A of FIG. 5.

Referring to FIGS. 1 to 6, when a soldering process starts, the solder bump forming apparatus 101 of the soldering facility 100 may heat and agitate the solder 20 in the solder bath 120. To this end, the driving motor 144 of the driver 140 is driven, such that the rotating gear 142b of the double gear 142 may receive the rotational force of the belt 146 and rotate. Therefore, the agitating roller 132 of the agitator 130 rotates, such that the solder 20 may be agitated. In addition, the heater 134a of the heating device 134 may be controlled by the temperature controller 134b and heat the solder 20 to the preset temperature. Therefore, the solder 20 may be heated to the preset temperature while being agitated by the agitator 130.

In addition, the suction member 156 of the suction pressure provider 150 is driven, such that the suction line 154 may provide the suction pressure to the suction pressure providing space 30 in the suction chamber 152. Here, the suction pressure may be vacuum pressure. To this end, as the suction member 156, a vacuum pump may be used. The vacuum pump is driven, such that the suction pressure providing space 30 may become a vacuum state.

As described above, when a standby of the soldering process of the solder bump forming apparatus 101 is completed, the clamper 102a of the substrate transferring apparatus 102 may clamp an inactive region of an edge of the processing substrate 10, and the clamper transferring device 102b thereof may transfer the clamper 102a so that the processing substrate 10 is transferred along the upper portion of the solder bump forming apparatus 101. Therefore, the solder 20 in the solder bath 120 contacts the electrode pad 14 of the circuit board 12 selectively exposed by the protection pattern 16, thereby making it possible to form a solder bump on the electrode pad 14 of the processing substrate 10.

Here, as shown in FIGS. 5 and 6, a direction in which the processing substrate 10 is transferred may accord a direction in which the solder 20 moves. That is, as shown in FIG. 5, the agitating roller 132 rotates clockwise and the processing substrate 10 is transferred to the right, thereby making it possible to allow the direction in which the processing substrate 10 is transferred to correspond to the direction in which the solder 20 moves. In this case, the solder 20 may enter the electrode pad 14 selectively exposed by the protection pattern 16 in an oblique line direction 40. Since the solder 20 may more effectively enter the electrode pad 14 in the case in which the solder 20 enters the electrode pad 14 through an opening of the protection pattern 16 in the oblique direction 40 than in the case in which the solder 20 enters the electrode pad 14 in a vertical direction, solder bump forming efficiency may be improved. Particularly, since force pushing up the solder 20 toward the processing substrate 10 is applied to the solder 20 by movement pressure of the agitator 130, the solder 20 may more effectively enter the opening of the protection pattern 16.

Meanwhile, the suction pressure provider 150 may provide the suction pressure to the processing substrate 10 before the processing substrate 10 enters the solder bath 120. That is, the processing substrate 10 entering the solder bath 120 may be subjected to suction treatment by the suction pressure applied to the suction chamber 152, before entering the solder bath 120. In this case, foreign materials, unnecessary fluxes, and the like, on the processing substrate 10 may be sucked and removed by the suction chamber 152.

In addition, the suction pressure provider 150 may serve to remove air in the opening of the protection pattern 16 before the soldering process of the processing substrate 10. In the case in which the air is present on a processing surface of the processing substrate 10 before the soldering process, the entry of the solder 20 into the electrode pad 14 may be hindered by the air during a process in which the solder 20 enters the electrode pad 14 through the opening of the protection pattern 16. Therefore, the suction chamber 152 may suck the processing substrate 10 immediately before the soldering process is performed, thereby preventing the hindrance of the entry of the solder 20 into the electrode pad 14 due to the air.

Here, in order to raise an air removal rate, the suction chamber 152 may also be provided in a vacuum state to apply vacuum pressure to the processing substrate 10. To this end, at the time of the soldering process, the processing substrate 10 may contact the sidewall 123 of the solder bath 120. Therefore, the opened upper portion of the vacuum chamber 152 may be closed by the processing substrate 10 at the time of the soldering process, such that the suction pressure providing space 30 may become a vacuum state. In addition, the sidewall 123 of the solder bath 120 may be configured to squeeze the processing substrate 10.

As described above, the solder bump forming apparatus 101 according to the embodiment of the present invention may include the agitator 130 heating the solder 20 to the preset temperature simultaneously with agitating the solder 20 while providing movement pressure to the solder 20 in the solder bath 120. Therefore, the solder bump forming apparatus and the soldering facility including the same according to the exemplary embodiment of the present invention includes the agitator heating the solder to the preset temperature simultaneously with agitating the solder in a roller driving scheme, thereby making it possible to effectively agitate and heat the solder.

The solder bump forming apparatus 101 according to the exemplary embodiment of the present invention may include the agitator 130 providing the movement pressure to the solder 20 so that the solder 20 is pushed up with respect to the processing substrate 10 in the oblique line direction 40 at the time of the soldering process. Therefore, the solder bump forming apparatus and the soldering facility including the same according to the exemplary embodiment of the present invention may apply the movement pressure to the solder so that the solder is pushed up toward the opening of the protection pattern exposing the electrode pad in the oblique line direction at the time of the soldering process. In this case, since the solder may effectively enter the opening of the protection pattern exposing the electrode pad, the solder effectively enters the electrode pad even in a fine-pitched circuit board, thereby making it possible to improve solder bump forming efficiency.

In addition, the solder bump forming apparatus 101 according to the embodiment of the present invention may include the suction pressure provider 150 providing the suction pressure to the processing substrate 10 before the processing substrate 10 enters the solder bath 120. In this case, the foreign materials or the air on the processing substrate 10 are removed before the soldering process, such that the solder 20 may effectively enter the electrode pad 14 through the opening of the protection pattern 16 at the time of the soldering process. Therefore, the solder bump forming apparatus and the soldering facility including the same according to the exemplary embodiment of the present invention may prevent the entry of the solder into the electrode pad due to the foreign materials and the air remaining on the processing substrate at the time of the soldering process.

As set forth above, the solder bump forming apparatus and the soldering facility including the same according to the exemplary embodiment of the present invention includes the agitator heating the solder to the preset temperature simultaneously with agitating the solder in a roller driving scheme, thereby making it possible to effectively agitate and heat the solder.

The solder bump forming apparatus and the soldering facility including the same according to the exemplary embodiment of the present invention apply the movement pressure to the solder so that the solder is pushed up toward the opening of the protection pattern exposing the electrode pad in the oblique line direction at the time of the soldering process to allow the solder to effectively enter the electrode pad, thereby making it possible to the solder bump forming efficiency.

The solder bump forming apparatus and the soldering facility including the same according to the exemplary embodiment of the present invention may prevent the entry of the solder into the electrode pad due to the foreign materials and the air remaining on the processing substrate at the time of the soldering process.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A solder bump forming apparatus performing a soldering process on a substrate, the solder bump forming apparatus comprising:
 a solder bath receiving a solder therein;
 an agitator agitating the solder in the solder bath, the agitator including
  an agitating roller rotatably installed in the solder bath,
  a heater fixedly installed in the agitating roller to thereby heat the solder, and
  a temperature controller controlling a heating temperature of the heater;
 a driver driving the agitator; and
 a suction pressure provider providing suction pressure to the substrate.

2. The solder bump forming apparatus according to claim 1, wherein the suction pressure provider includes:
 a suction chamber provided to enclose the solder bath to thereby provide, together with the solder bath, a space in which the suction pressure is applied; and
 a suction line connected to the suction chamber.

3. The solder bump forming apparatus according to claim 2, wherein the suction pressure is vacuum pressure, and
 a vacuum pump is provided on the suction line.

4. The solder bump forming apparatus according to claim 1, wherein the solder bath includes a storing container having a structure in which an upper portion thereof is opened, the storing container including: a lower wall; a lower sidewall vertically extended upwardly from the lower wall; and an upper sidewall extended to be inclined so as to become close to the center of the storing container from an upper end of the lower sidewall toward an upward direction.

5. The solder bump forming apparatus according to claim 1, wherein the driver includes:
 a double gear coupled to the agitator, the double gear including a fixed gear and a rotating gear coupled to the agitator and rotating along the circumference of the fixed gear based on the fixed gear; and
 a driving motor driving the double gear.

6. The solder bump forming apparatus according to claim 5, wherein:
 the temperature controller has an electrical line connected to the heater so as to control a heating temperature of the heater, the electrical line being connected to the heater through the fixed gear.

7. A soldering facility comprising:
 a substrate transferring apparatus transferring a processing substrate; and
 a solder bump forming apparatus performing a soldering process on the processing substrate transferred by the substrate transferring apparatus, the solder bump forming apparatus including:
  a solder bath receiving a solder therein,
  an agitator agitating the solder in the solder bath, the agitator including:
   an agitating roller rotatably installed in the solder bath,
   a heater fixedly installed in the agitating roller to thereby heat the solder, and
   a temperature controller controlling a heating temperature of the heater;
  a driver driving the agitator, and
  a suction pressure provider providing suction pressure to the processing substrate transferred on the solder bath by the substrate transferring apparatus.

8. The soldering facility according to claim 7, wherein the substrate transferring apparatus includes:
 a clamper clamping an edge portion of the processing substrate so that a processing surface of the processing substrate is directed downwardly; and
 a clamper transferring device driving the clamper.

9. The soldering facility according to claim 7, wherein the suction pressure provider includes:
 a suction chamber provided to enclose the solder bath to thereby provide, together with the solder bath, a space in which the suction pressure is applied; and
 a suction line connected to the suction chamber.

10. The soldering facility according to claim 7, wherein the solder bath includes a storing container having a structure in which an upper portion thereof is opened, the storing container including: a lower wall; a lower sidewall vertically extended upwardly from the lower wall; and an upper sidewall extended to be inclined so as to become close to the center of the storing container from an upper end of the lower sidewall toward an upward direction.

11. The soldering facility according to claim 7, wherein the driver includes:
 a double gear coupled to the agitator, the double gear including a fixed gear and a rotating gear coupled to the agitator and rotating along the circumference of the fixed gear based on the fixed gear; and
 a driving motor driving the double gear.

12. The soldering facility according to claim 11, wherein:
 the temperature controller has an electrical line connected to the heater so as to control a heating temperature of the heater, the electrical line being connected to the heater through the fixed gear.

13. The soldering facility according to claim 8, wherein the suction pressure provider includes:
 a suction chamber provided to enclose the solder bath to thereby provide, together with the solder bath, a space in which the suction pressure is applied; and
 a suction line connected to the suction chamber.

14. The soldering facility according to claim 8, wherein the solder bath includes a storing container having a structure in which an upper portion thereof is opened, the storing container including: a lower wall; a lower sidewall vertically extended upwardly from the lower wall; and an upper sidewall extended to be inclined so as to become close to the center of the storing container from an upper end of the lower sidewall toward an upward direction.

15. The soldering facility according to claim 8, wherein the driver includes:
 a double gear coupled to the agitator, the double gear including a fixed gear and a rotating gear coupled to the agitator and rotating along the circumference of the fixed gear based on the fixed gear; and
 a driving motor driving the double gear.

* * * * *

UNITED STATES PATENT AND TRADEMARK OFFICE
CERTIFICATE OF CORRECTION

PATENT NO. : 8,651,356 B2  
APPLICATION NO. : 13/675235  
DATED : February 18, 2014  
INVENTOR(S) : Mukai et al.

Page 1 of 1

It is certified that error appears in the above-identified patent and that said Letters Patent is hereby corrected as shown below:

In the Claims

Column 9, Line 50, In Claim 6, delete "wherein:" and insert -- wherein --, therefor.
Column 9, Line 61, In Claim 7, delete "including:" and insert -- including --, therefor.
Column 10, Line 6, In Claim 7, delete "heater;" and insert -- heater, --, therefor.
Column 10, Line 38, In Claim 12, delete "wherein:" and insert -- wherein --, therefor.

Signed and Sealed this
Twenty-ninth Day of July, 2014

Michelle K. Lee
*Deputy Director of the United States Patent and Trademark Office*